United States Patent Office 3,354,056
Patented Nov. 21, 1967

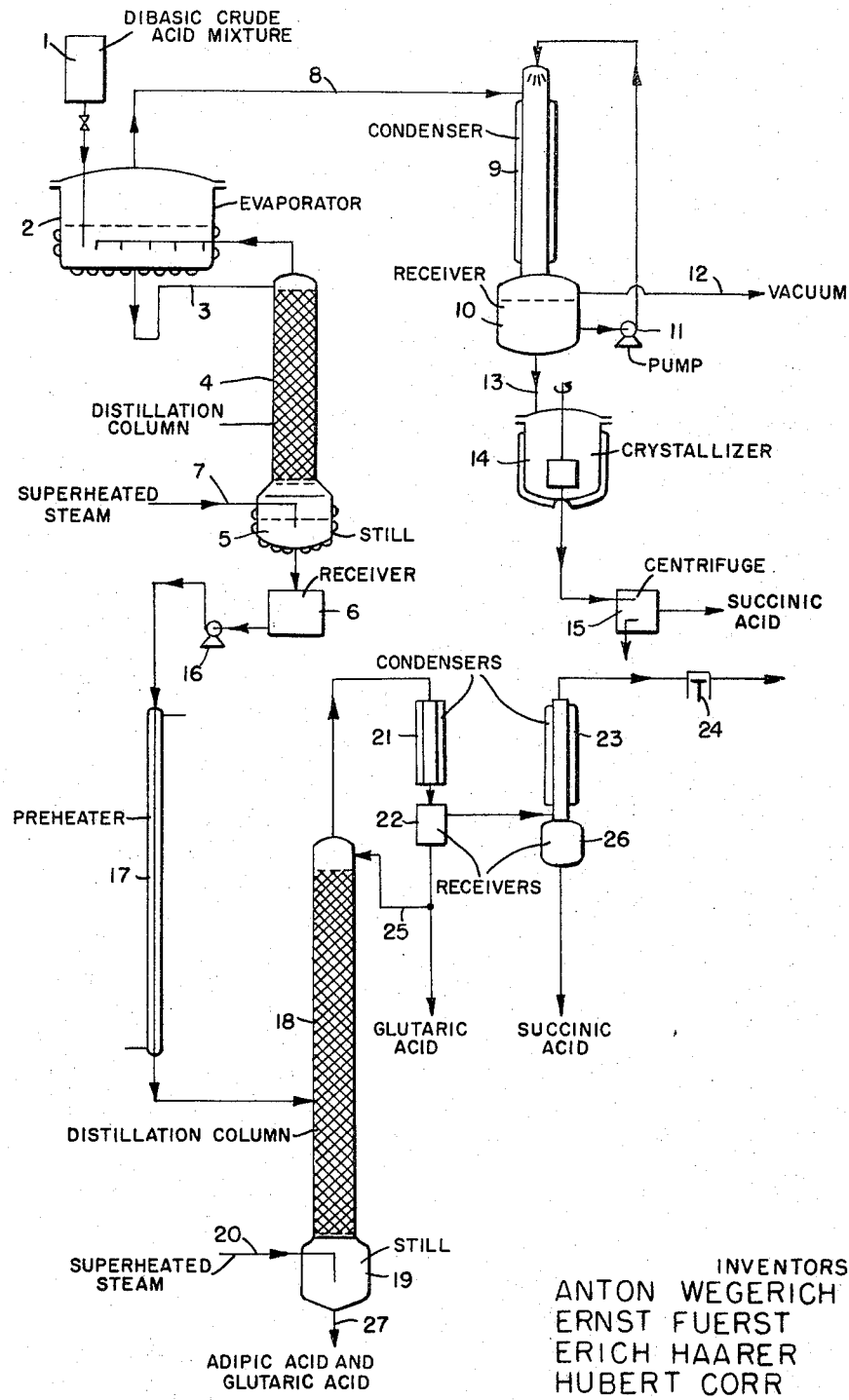

3,354,056
STEAM DISTILLING AND CRYSTALLIZATION TO SEPARATE SUCCINIC ACID, GLUTARIC ACID AND ADIPIC ACID FROM MIXTURE THEREOF
Anton Wegerich, Limburgerhof, Pfalz, Ernst Fuerst, Neustadt, Weinstrasse, and Erich Haarer and Hubert Corr, Ludwigshafen (Rhine), Germany, assignors to Badische Anilin- & Soda-Fabrik Aktiengesellschaft, Ludwigshafen (Rhine), Germany
Filed June 23, 1964, Ser. No. 377,234
Claims priority, application Germany, June 26, 1963, B 72,428
4 Claims. (Cl. 203—48)

ABSTRACT OF THE DISCLOSURE

Separation of succinic acid, glutaric acid and adipic acid from mixtures containing such dicarboxylic acids by introducing a mixture containing said dicarboxylic acids at a pressure of 40 to 150 mm. Hg into a steam distillation column, the inner wall of which is heated to at least 180° C. and in which the bottoms' temperature is kept at 195° to 220° C., evaporating essentially the succinic acid portion of said mixture by means of steam distillation, introducing the resultant succinic acid overhead into an evaporator, condensing the effluent vapors in an aqueous medium, separating the succinic acid by crystallization from the aqueous medium, withdrawing a portion of the bottoms from the steam distillation column and separating it by steam distillation under subatmospheric pressure into an overhead fraction consisting substantially of glutaric acid and a bottoms fraction consisting mainly of adipic acid and some glutaric acid.

This invention relates to a process for the separation of succinic acid, glutaric acid and adipic acid from mixtures containing them.

In the continuous oxidation of cyclohexanol with nitric acid to form adipic acid, there is an accumulation in the nitric acid, if it is recycled, of succinic acid and glutaric acid as well as small amounts of other impurities. A portion of the acid containing the impurities is therefore withdrawn from the nitric acid cycle and processed. The procedure may be that adipic acid is first crystallized out and removed and the mother liquor is then cooled to 0° to −10° C. so that after repeated washing a crystallisate of a mixture of 30 to 35% of succinic acid, 60 to 70% of adipic acid and 0.5 to 1% of glutaric acid is obtained. If the mother liquor is then evaporated, a dicarboxylic acid mixture is obtained containing 85 to 90% of glutaric acid and 5 to 7% each of succinic acid and adipic acid which after destroying labile impurities by heating to about 140° to 180° C. may be distilled over at subatmospheric pressure to remove non-vaporizable residues, such as catalyst, silicic acid and metals. Rectification of the dicarboxylic acids is difficult because deposition of solid substances may easily cause stoppages in the distillation plant. Moreover very efficient columns are necessary.

Another method of processing the nitric acid solution of the said dicarboxylic acids consists in separating a portion of the adipic acid, evaporating the nitric acid by heating to about 140° C. and separating by distillation the dicarboxylic acids at greatly reduced pressure from non-vaporizable residues. The distillate obtained is a mixture consisting of about half of glutaric acid and about one quarter each of succinic acid and adipic acid.

When cyclohexane is oxidized with air, the oxidation mixture is washed with water. The water then contains adipic acid, succinic acid, glutaric acid and hydroxycaproic acid. If this solution be concentrated and treated with nitric acid, a solution of adipic acid, succinic acid and glutaric acid is obtained from which the aqueous nitric acid may be evaporated. The mixture of dicarboxylic acids thus obtained contains impurities which give a yellow coloration of the melt. It is advantageous to remove these impurities by extraction for example with chloroform or benzene. Light colored or white melts are then obtained.

Separation of the dicarboxylic acids by rectification is an obvious step, but the following difficulties are encountered:

Owing to the formation of anhydrides and the sensitivity of the products, particularly adipic acid, to high temperatures, it is not possible to use temperatures higher than 200° to 240° C., the pressure in the distillation column then being about 10 to 30 mm. Hg. At this pressure, however, succinic acid boils far below its melting point. Consequently when the component of lowest boiling point, succinic acid, accumulates, solid deposits are formed in the column and make continuous operation impossible.

According to the process of Belgian patent specification No. 614,720, succinic acid and glutaric acid are first dehydrated to the anhydrides and then the mixture is fractionated. There is then no occurrence of deposits in the column because succinic anhydride has a boiling point which is above its melting point. Good results are obtained with this method only if a very efficient column is used.

It is an object of the invention to provide a process for the recovery of succinic acid, glutaric acid and adipic acid from mixtures containing the said acids, in which process the succinic acid can be separated without a highly efficient distillation column. Another object of the invention is to provide a process which is simpler than the methods of the prior art for the recovery of the said acids.

These and other objects and advantages of the invention will be better understood from the following detailed description in conjunction with the accompanying drawing in which an apparatus suitable for carrying out the process according to the invention is shown diagrammatically.

We have found that succinic acid, glutaric acid and adipic acid may be recovered from mixtures containing these dicarboxylic acids in a comparatively simple way and with low distillation costs even without the use of efficient columns by heating under subatmospheric pressure to at least 160° C. and subsequent fractional distillation by bringing the mixture containing dicarboxylic acids at a pressure of 40 to 200 mm. Hg into a vaporization zone whose internal wall is heated to at least 180° C. and whose bottom temperature is kept at 195° to 220° C., evaporating in the said vaporization zone by means of steam that portion of the mixture which contains the succinic acid, cooling the effluent vapors to room temperature, separating the succinic acid which thus crystallizes out from the aqueous layer, optionally returning this to the vaporization zone after substantial removal of water by evaporation, withdrawing from the bottom of the vaporization zone a portion of the liquid corresponding to the content of adipic acid and glutaric acid and separating this portion into adipic acid and glutaric acid by vacuum distillation with an addition of steam.

The initial material may particularly be a mixture which has been obtained in the oxidation of cyclohexanol and cyclohexanone, or oxidation mixtures obtained in the air oxidation of cyclohexane. Adipic acid is advantageously previously crystallized out by cooling. It is also advantageous to separate any nitric acid and non-vaporizable substances still present prior to the treatment according to this invention. The acid mixture remaining consists of about half of glutaric acid and one quarter each of succinic acid and adipic acid.

The process is however quite generally applicable with advantage to dicarboxylic acid mixtures in which each or at least two of the three acids are contained in an amount of between 20 and 60%. If any of the three acids is present in a concentration of 70% or more then crystallization may in a simple way give a pure product and the process according to the invention is applied with advantage to the mother liquor from the crystallization.

The dicarboxylic acid mixture may be used in molten, dissolved and/or solid form, i.e. the acid mixture may be used in aqueous solution, in aqueous suspension or in solid form. When solutions are used, their content of organic acids should amount to at least 50% by weight. The dicarboxylic acid mixture is supplied to a vaporizer heated to 195° to 220° C. At the same time, superheated steam is passed into the bottom of the vaporizer. It is also possible to introduce into the dicarboxylic acid mixture, liquid water which is vaporized by heating to 200° C. The vaporized water becomes laden with dicarboxylic acid vapor. The relative proportions of steam supplied may vary within wide limits, for example from 10 to 40% by weight, with reference to the acid mixture introduced (calculated as dry material). When the acid mixture is supplied in aqueous solution or suspension, the added water must be taken into account when supplying steam. The amount of steam advantageously used depends on the total pressure. At low pressures, for example at 40 to 80 mm. Hg, about 10 to about 20% by weight of steam is used, and at higher pressures, for example at 120 to 200 mm. Hg, about 30 to 40% by weight of steam is used. Distillation in the vaporizer is carried out at subatmospheric pressure, preferably at about 40 to 200 mm. Hg, particularly in the range of 40 to 150 mm. Hg.

The vaporizing process for the removal of succinic acid is advantageously carried out as rapidly as possible so that formation of anhydride is suppressed. It is advantageous to choose a residence period in the vaporizer of less than twenty minutes, particularly one to five minutes. A falling film vaporizer is particularly suitable as a vaporizer having a short residence period. It is also possible however to use heated columns packed with tower packing, provided with baffles or with spirals or with bubble trays, advantageously with heated bubble trays. In the case of vaporizers or columns having great internal width, it is advisable to provide internal heating in the upper portion so that the same temperature prevails in the interior of the column as at the wall. In this vaporizing step such an amount of initial mixtures is evaporated as corresponds to the amount of succinic acid. The vapor contains approximately 58 wt. percent succinic acid, 39% water and 3% glutaric and adipic acids. The succinic acid is then condensed, solid succinic acid suspended in aqueous solution being obtained. The succinic acid is separated and the aqueous succinic acid solution containing some glutaric and adipic acids, optionally after complete or partial removal of water, is advantageously returned to the vaporizer so that waste is avoided.

A portion of the distillation residue is withdrawn continuously or periodically from the bottom of the vaporizer; it consists of glutaric acid, adipic acid and some succinic acid. This residue is withdrawn at the rate at which adipic acid and glutaric acid occur. The residue withdrawn is then heated and supplied to a column. Generally bubble tray columns, preferably with twenty trays or more, are used. The pressure drop in the column should be as small as possible. Steam in an amount of 0.2 to 0.8 kg. per kg. of glutaric acid is passed into the bottom of the column. The bottom temperature is kept at 180° to 200° C. A pressure of 30 to 100 mm. Hg is set up at the top of the column. The escaping vapors are cooled to about 130° C. and supplied to a receiver. The condensate consists mainly of glutaric acid. This condensate is returned continuously in an amount of 80 to 95% into the upper part of the column. Only the remainder is withdrawn. The vapors escaping from the receiver are then cooled to room temperature and supplied to another receiver. Pure succinic acid is recovered from the resultant aqueous solution by cooling or partial evaporation. The mother liquor contains glutaric acid and succinic acid and is returned to the vaporizer. A mixture containing 80 to 90% of adipic acid is withdrawn from the bottom of the bubble tray column. Pure adipic acid may be recovered by crystallization, while the mother liquor is returned to the bubble tray column. It is advantageous to free the adipic acid from colored constituents by vacuum distillation prior to the crystallization.

The invention will now be further illustrated by the following example given with reference to the accompanying drawing which shows diagrammatically an apparatus suitable for carrying out the process according to this invention.

*Example*

10 kg. of a melt of dicarboxylic acid mixture consisting of 50% of glutaric acid, 26% of succinic acid and 24% of adipic acid is supplied from a receiver 1 to an evaporator 2 in which it is heated to 200° C. and in which a pressure of 100 mm. Hg is maintained. The mixture flows through a distilling column 4 provided with Raschig rings into a still 5 which is also heated to 200° C. and thence into a receiver 6. 1.5 kg. per hour of superheated steam is injected through line 7 in a finely dispersed condition into the dicarboxylic acids in the still 5. The steam, laden with dicarboxylic acid vapors, streams from the still 5 through the distilling column 4 into the evaporator 2 being finely dispersed in the bottom thereof. The vapors pass through line 8 into a condenser 9 and are trickled therein with an aqueous solution from a receiver 10 by means of a pump 11. About ten times as much water is supplied through pump 11 to the top of the column as is supplied to the column through line 8. Line 12 leads to a vacuum pump. Dicarboxylic acids and condensed water collect in the receiver 10. This aqueous solution is barometrically discharged through line 13 and supplied to a vessel 14 in which succinic acid is crystallized out by cooling.

The suspension of crystals is passed through a centrifuge 15 in which the crystallizate and the mother liquor are separated. 2.54 kg. of succinic acid is obtained per hour as the crystallizate. After having been recrystallized once from water, succinic acid having a purity of 99.9% is obtained.

0.060 kg. of succinic acid, 0.87 kg. of glutaric acid and 0.43 kg. of adipic acid are present in dissolved form in the mother liquor obtained per hour.

The mother liquor is evaporated and the dicarboxylic acid mixture thus obtained is returned to the crude product.

The product obtained in the receiver 6 consists of 66.5% of glutaric acid, 32.6% of adipic acid and 0.9% of succinic acid. About 2% of water is added to this mixture to convert anhydrides into acids. It is then pumped by a pump 16 through a preheater 17 into a column 18. In the still 19 of the column 18, the bottom is heated to 200° C. Superheated steam is passed through line 20 into the still 19. The vapors leaving the top of the column 18 are cooled to about 130° C. in a condenser 21, a liquid glutaric acid condensate thus being formed which flows into a receiver 22, while the steam with the succinic acid flows to the condenser 23 in which it is condensed. Inert gas is withdrawn by a vacuum pump 24. A vacuum of 40 to 50 mm. Hg is maintained at the top of the column. Steam is supplied at 20 in an amount of 0.4 kg. per kg. of glutaric acid vapor. 90% of the condensate in the receiver 22 is returned to the column through line 25 as a reflux and the remaining 10% is withdrawn as distillate. The distillate consists of 98% of glutaric acid and 2% of adipic acid. An aqueous solution is obtained in a receiver 26 and pure succinic acid crystallizes out therefrom by cooling or partial evaporation. The mother liquor, containing glutaric acid and succinic acid, is returned to the first distillation. A mixture of 82% of adipic acid and 18% of glutaric acid is withdrawn from the bottom of the still 19 through a line 27. Adipic acid may be recovered by crystallization and the mother liquor returned to the column 18.

We claim:

1. A process for the separation of succinic acid, glutaric acid and adipic acid from mixtures containing such dicarboxylic acids which comprises introducing a mixture containing said dicarboxylic acids at a pressure of 40 to 200 mm. Hg into an evaporating zone including a steam distillation zone, the inner wall of which is heated to at least 180° C. and wherein said zone's bottom temperature is kept at 195° to 220° C., evaporating essentially the succinic acid portion of said mixture by means of steam stripping distillation, cooling the effluent vapors to room temperature in an aqueous medium, separating the succinic acid by crystallization of the succinic acid in the resultant aqueous layer, withdrawing a portion of the bottoms from the evaporating zone and separating it by steam stripping distillation under subatmospheric pressure of 30 to 100 mm. Hg at the top of the evaporating zone and bottoms temperature of 180° C. to 200° C. into an overhead fraction consisting substantially of glutaric acid and a bottoms fraction consisting substantially of adipic acid.

2. A process for the separation of succinic acid, glutaric acid and adipic acid from mixtures containing such dicarboxylic acids which comprises introducing a mixture containing said dicarboxylic acids at a pressure of 40 to 150 mm. Hg into an evaporating zone including a steam distillation zone, the inner wall of which is heated to at least 180° C. and wherein said zone's bottom temperature is kept at 195° to 220° C., evaporating essentially the succinic acid portion of said mixture by means of steam stripping distillation, cooling the effluent vapors in an aqueous medium, separating the succinic acid by crystallization of the succinic acid in the resultant aqueous layer, withdrawing a portion of the bottoms from the evaporating zone and separating it by steam stripping distillation under subatmospheric pressure of 30 to 100 mm. Hg at the top of the evaporating zone and bottoms temperature of 180° C. to 200° C. into an overhead fraction consisting substantially of glutaric acid and a bottoms fraction consisting substantially of adipic acid.

3. A process as claimed in claim 1 wherein the aqueous solution obtained by separating the crystallized succinic acid is returned to the evaporating zone.

4. A process as claimed in claim 2 wherein the said aqueous solution obtained by separating the crystallized succinic acid is concentrated by evaporation and then returned to the evaporating zone.

References Cited

UNITED STATES PATENTS

| | | | |
|---|---|---|---|
| 2,054,096 | 9/1936 | Potts et al. | 203—77 |
| 2,703,331 | 3/1955 | Goldbeck et al. | 260—537 |
| 2,824,123 | 2/1958 | Kuceski | 260—537 |
| 2,840,607 | 6/1958 | Attane et al. | 260—537 |
| 2,915,462 | 12/1959 | Salmon. | |
| 2,961,462 | 11/1960 | Chafetz | 260—537 |
| 3,014,070 | 12/1961 | Chafetz | 260—537 |
| 3,036,127 | 5/1962 | Chafetz | 260—537 X |
| 3,180,878 | 4/1965 | Cambell et al. | 260—537 |
| 3,290,369 | 12/1966 | Bonfield et al. | 260—531 X |

FOREIGN PATENTS 745,034  2/1956  Great Britain.

NORMAN YUDKOFF, *Primary Examiner.*

F. E. DRUMMOND, *Assistant Examiner.*